United States Patent [19]
Anderson et al.

[11] Patent Number: 5,392,697
[45] Date of Patent: Feb. 28, 1995

[54] CONVERTIBLE GAS OR ELECTRIC FIRED DONUT SYSTEM

[75] Inventors: Edward M. Anderson, Plymouth; Merritt K. Anderson, Brooklyn Park, both of Minn.

[73] Assignee: Lil' Orbits, Inc., Minneapolis, Minn.

[21] Appl. No.: 33,662

[22] Filed: Mar. 16, 1993

Related U.S. Application Data

[63] Continuation-in-part of Ser. No. 740,926, Aug. 6, 1991, Pat. No. 5,230,280.

[51] Int. Cl.⁶ ............................................. A47J 37/12
[52] U.S. Cl. ........................................ 99/340; 99/406; 99/409; 99/354
[58] Field of Search .................. 99/405, 406, 404, 407, 99/409, 354, 443 C, 340, 329 R, 330, 331, 338, 337

[56] References Cited

U.S. PATENT DOCUMENTS

| | | | |
|---|---|---|---|
| 2,023,863 | 12/1935 | Toews | 99/405 |
| 2,286,013 | 6/1942 | Roth | 99/409 |
| 3,283,695 | 11/1966 | Belshaw et al. | 99/405 |
| 3,504,619 | 4/1970 | Fester et al. | 99/405 |
| 3,902,839 | 9/1975 | Matthews | 431/46 |
| 3,914,092 | 10/1975 | Matthews | 431/66 |
| 3,947,220 | 3/1976 | Dietz | 431/80 |
| 4,082,033 | 4/1978 | Fester | 99/406 |
| 4,176,590 | 12/1979 | Kochan | 99/405 |
| 4,303,385 | 12/1981 | Rudich, Jr. et al. | 431/70 |
| 4,350,891 | 9/1982 | Wuerflein | 378/110 |
| 4,503,320 | 3/1985 | Polster | 99/337 |
| 4,594,941 | 6/1986 | Anderson | 99/406 |
| 4,658,709 | 3/1987 | Anderson | 99/409 |
| 4,680,664 | 7/1987 | Leuthen | 363/56 |
| 4,690,127 | 9/1987 | Sank | 126/391 |
| 4,785,725 | 11/1988 | Tate et al. | 99/337 |
| 4,823,247 | 4/1989 | Tamoto | 363/16 |
| 4,996,637 | 2/1991 | Piechnick | 363/16 |
| 5,059,117 | 10/1991 | Wills | 126/91 A |
| 5,133,786 | 7/1992 | Anderson | 55/97 |

OTHER PUBLICATIONS

Operating Instructions—SS 1200, Lil' Orbits.
Honeywell "Direct Spark Ignition Control Module S87A, B, C, D, J, K". Nov. 1984.
Brochure for Honeywell Q354A Flame Sensor. Jan. 1990.

*Primary Examiner*—Timothy F. Simone
*Assistant Examiner*—Reginald L. Alexander
*Attorney, Agent, or Firm*—Haugen and Nikolai

[57] ABSTRACT

A convertible gas fired or electrically heated donut cooking system is disclosed for automatic cooking of donuts featuring easy conversion from a gas fired embodiment using a low voltage battery operated controlled gas fired tube to an electric unit powered from ordinary household current for heating of the cooking oil. The electrically heated version replaces the gas fired tube and power inverter system with direct AC power supply and an electric immersion heater.

2 Claims, 9 Drawing Sheets

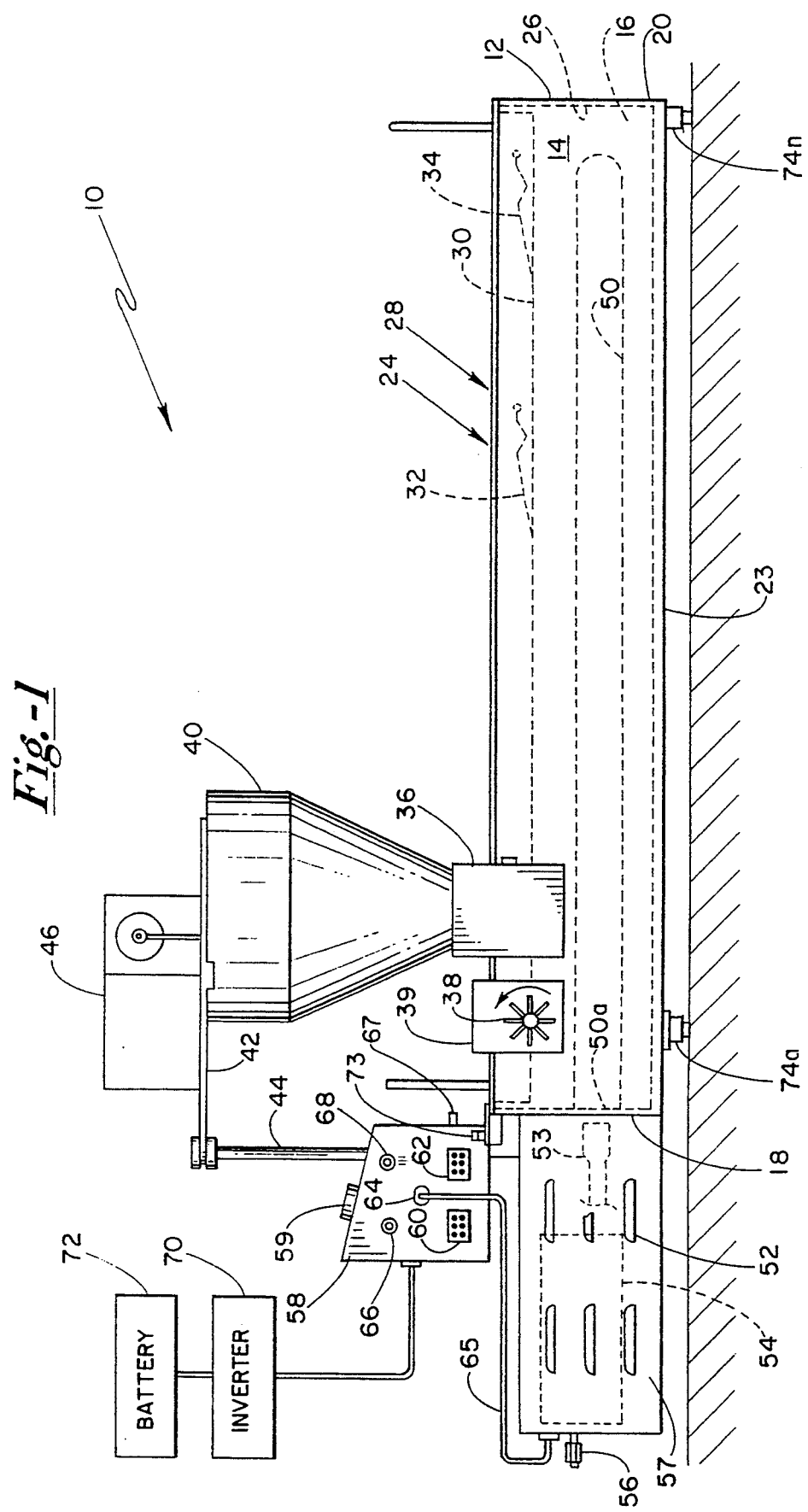

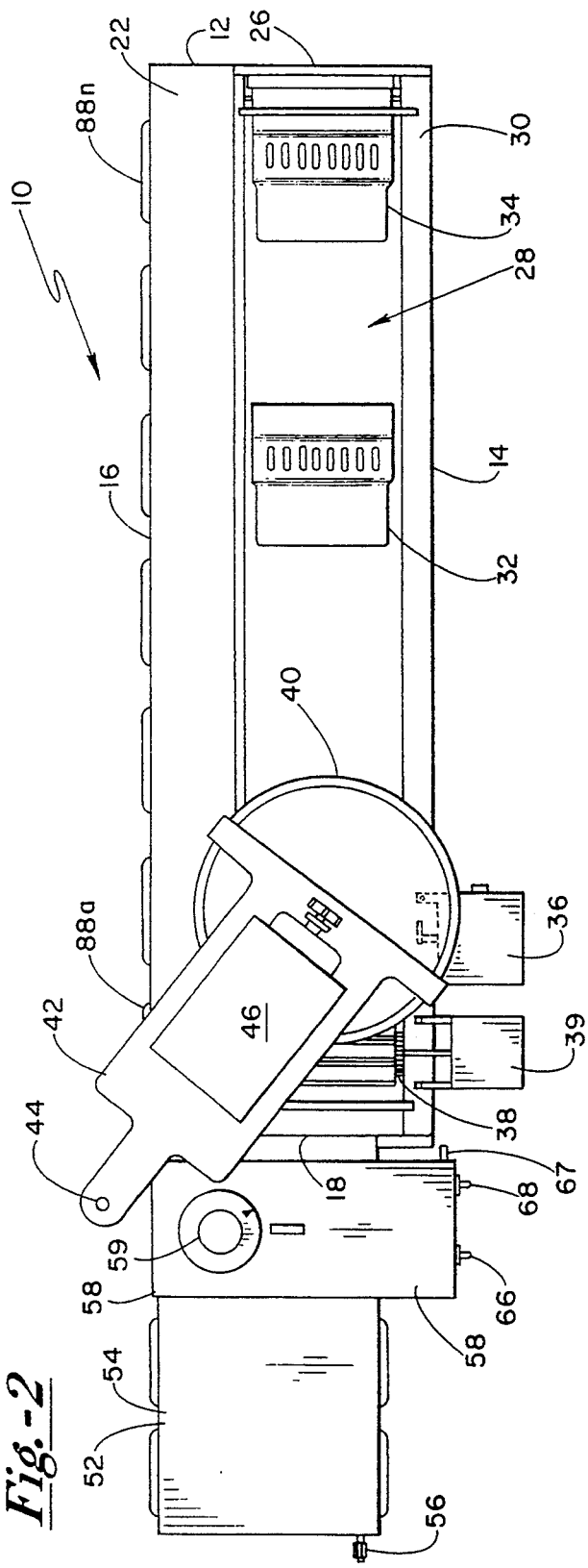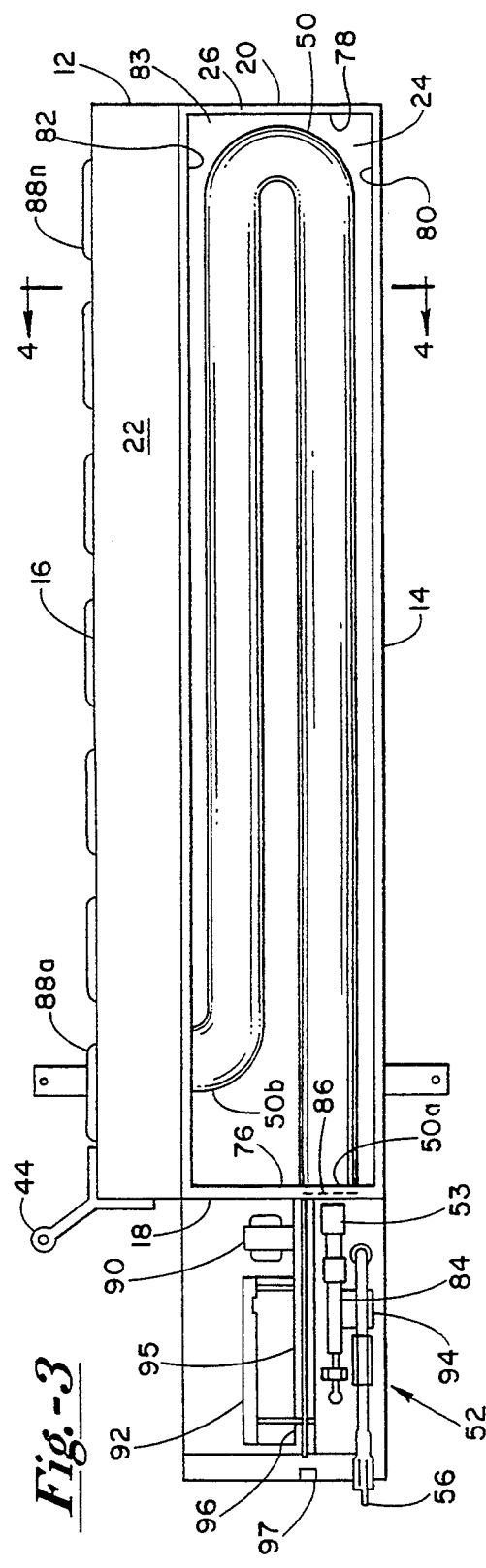

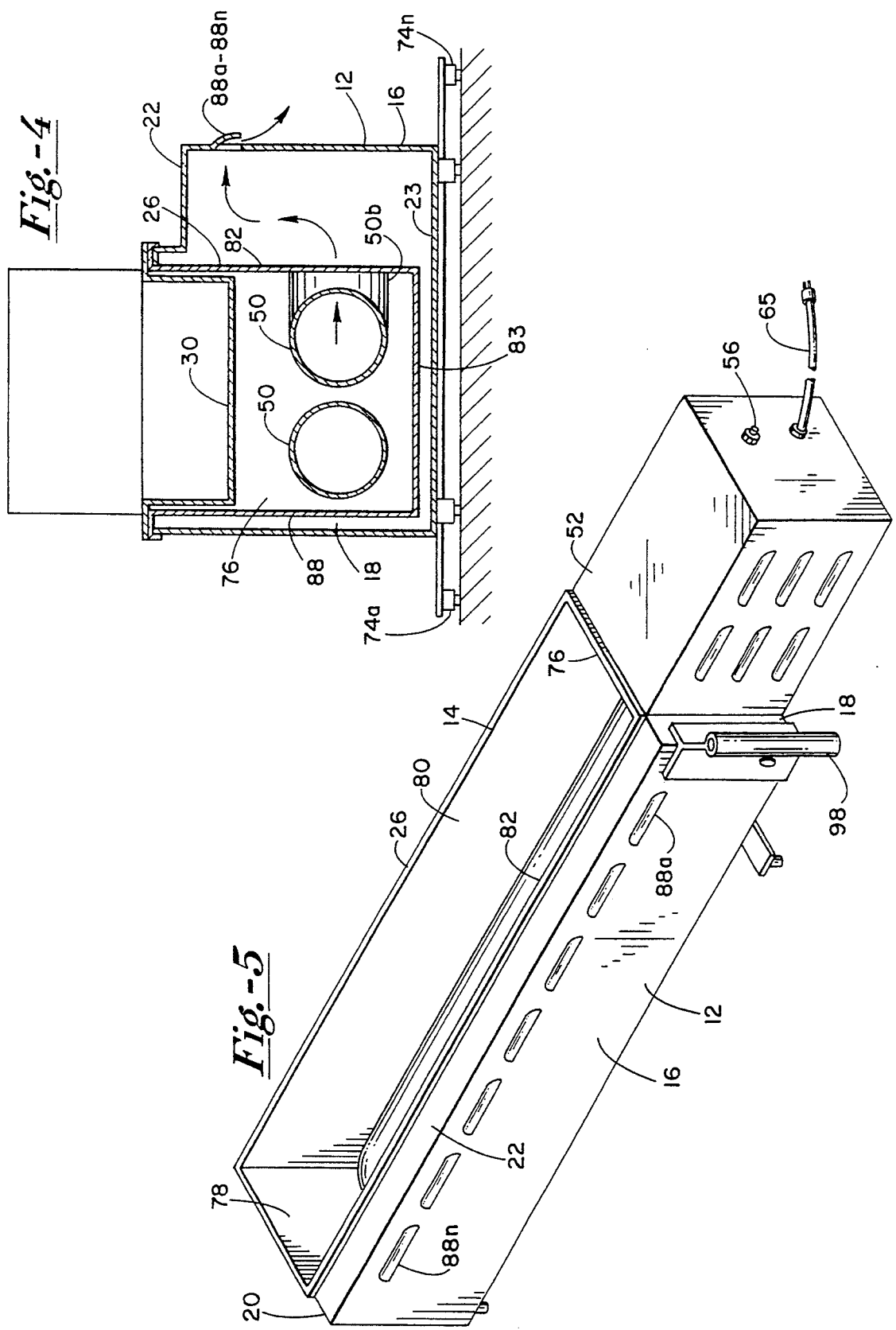

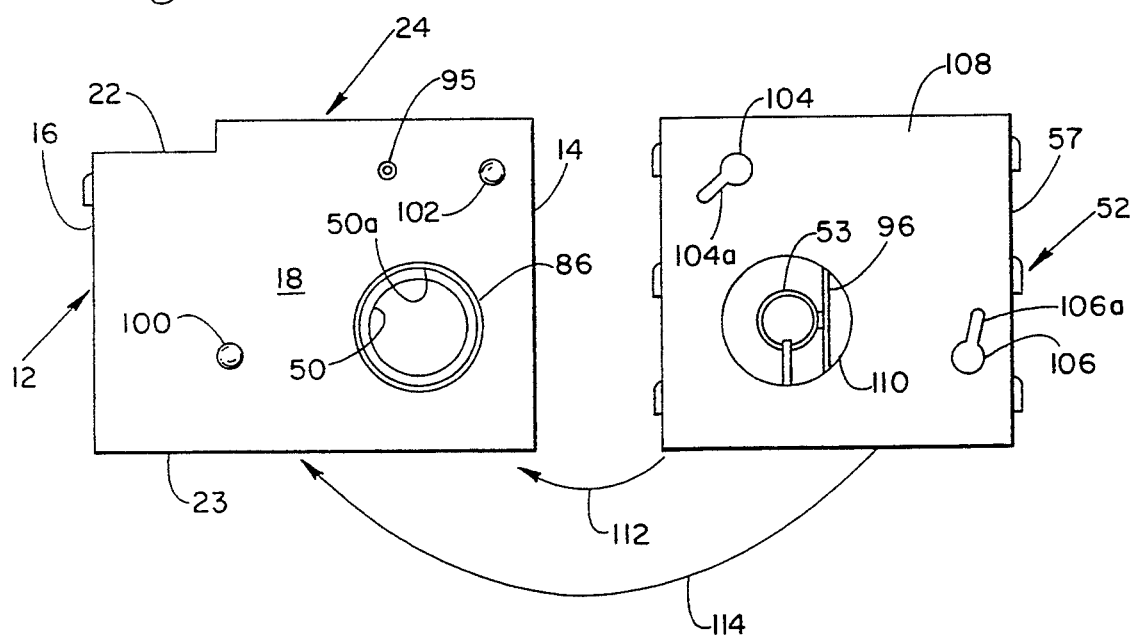

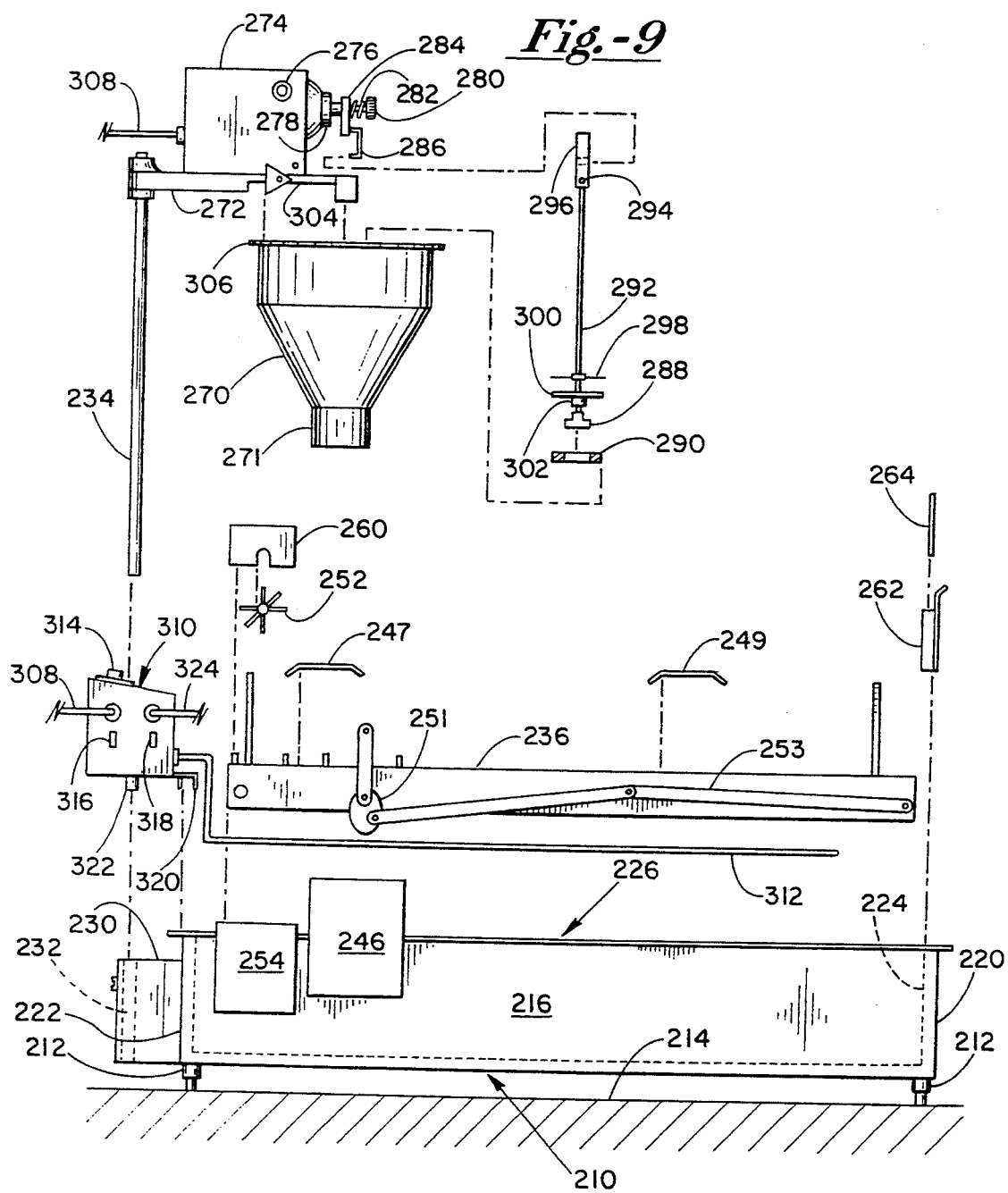

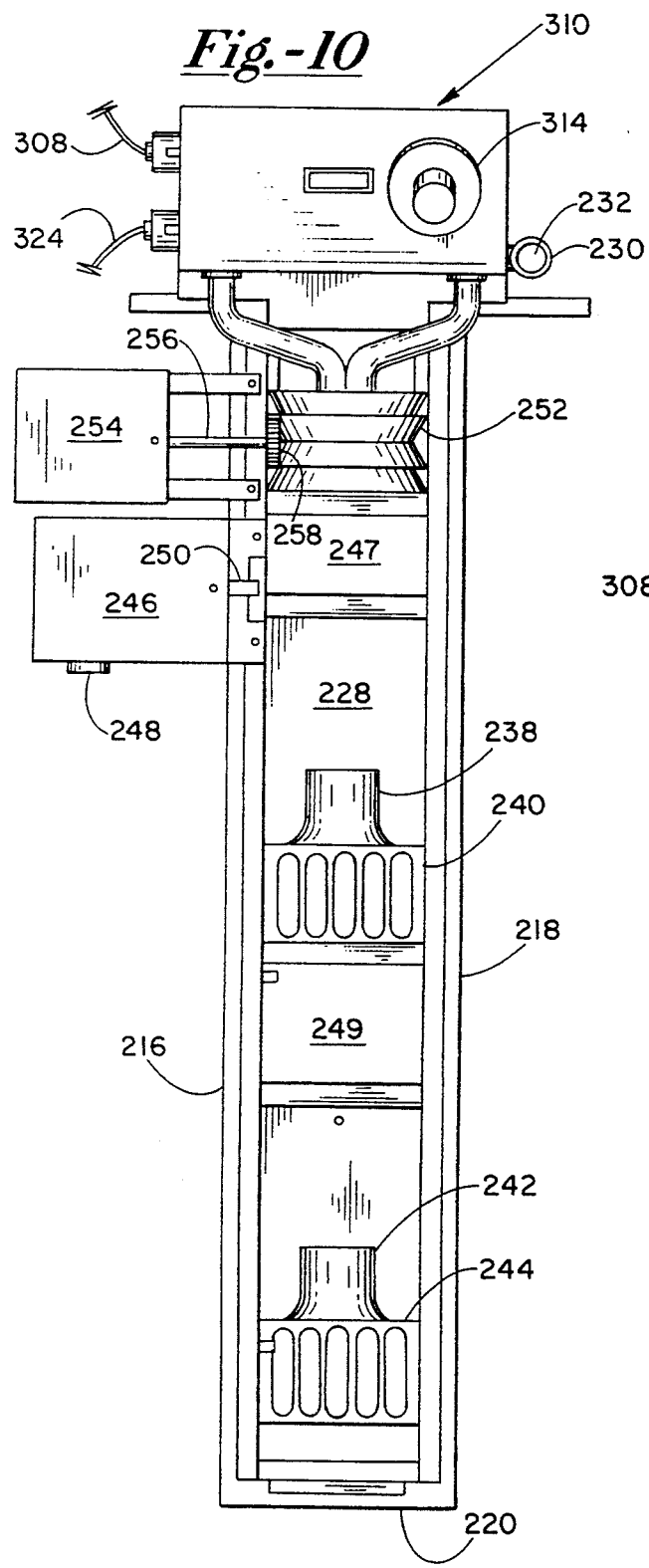
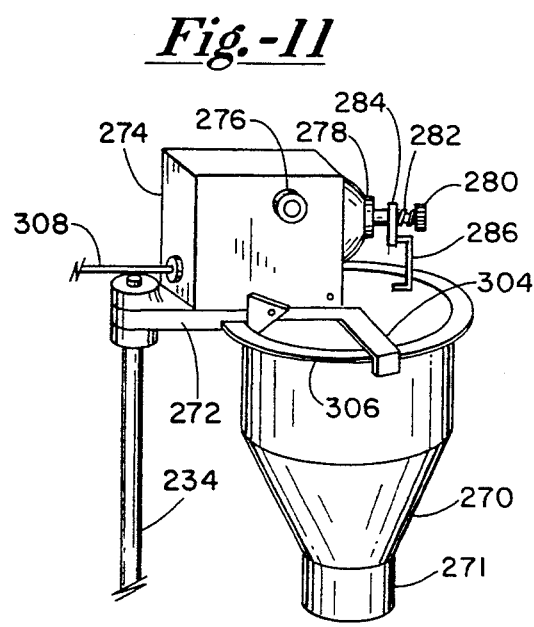

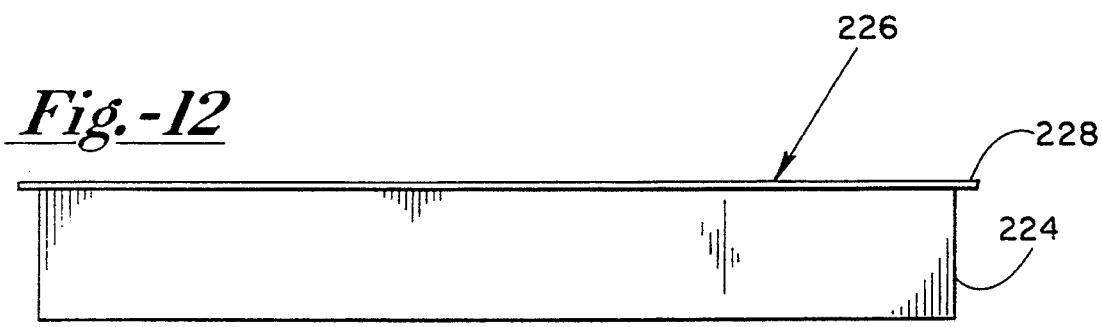
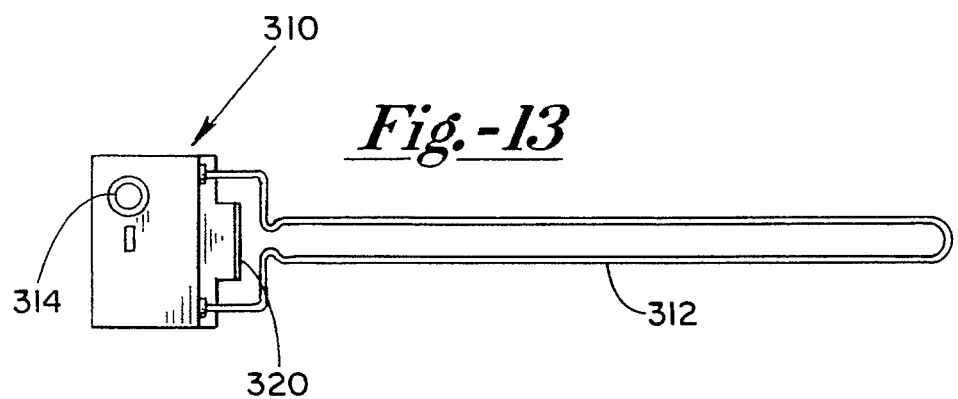

CONVERTIBLE GAS OR ELECTRIC FIRED DONUT SYSTEM

CROSS-REFERENCE TO RELATED APPLICATION

This application is a continuation-in-part of application Ser. No. 07/740,926, filed Aug. 6, 1991, now U.S. Pat. No. 5,230,280.

BACKGROUND OF THE INVENTION

I. Field of the Invention

The present invention relates to a gas or an electric fired donut production system, and deals with the conversion of the heating system therebetween, particularly in converting a gas fired system to an electrically heated one.

II. Description of the Prior Art

Prior art cooking devices, such as donut machines, have been location limited in that often there was no convenient source of alternating current. Sources of power available at sites frequented by vendors were limited if even existent. Usually a vendor either had to "string" long extensions cords if power was available. In the alternative, the vendor had to use an AC generator to power the equipment.

The present invention overcomes the inadequacies of the prior art by providing a gas fired donut system which operates from battery power at remote sites. Safety interlocks prevent inadvertent flame propagation and other unsuitable situations due to operator carelessness or inattention. The donut system can also be converted over to electrical operation.

Accordingly, an embodiment utilizing an electric heating system which can make use of a retrofitted electric immersion heating system or which can be designed initially for electric heat for use in areas where electric power is plentiful and may be the preferred heat source and is also a part of the invention.

SUMMARY OF THE INVENTION

The general purpose of the present invention is to provide a gas fired or electric-heated donut system which is automatic in operation, and which contains an enclosed gas fired heater tube or electric element, as the case may be, which can readily be converted from one mode to another, especially from a gas fired to an electrically heated version.

According to one embodiment of the present invention, there is provided an enclosure with a gas fired tube enclosed for the heating of cooking oil contained in a fry tank and handled cooking tray. A detachable low voltage gas firing module aligns with the enclosure and the enclosed gas fired tube to provide flame heat for the gas fired tube. A temperature controller unit also houses and provides control of a paddle wheel assembly, a servo motor assembly, and a hopper drive motor. An external battery and power inverter powers the temperature controller for remote site generation where AC power is not suitable. Donut dough is dispensed by a variable output hopper onto flowing hot cooking oil. Donut flippers turn the donuts over and also eject donuts from the handled cooking tray. Appropriate interlocks prevent inadvertent gas firing when major components are disconnected from each other.

An alternate embodiment is disclosed in which the gas fired heating system for the cooking fluid is replaced by an electric heating system using a heating element which may be immersed in the cooking liquid to achieve the same ends as the gas fired system. The electric heated embodiment may be designed to be interchangeable with the gas fired unit with minimal system changes or as a heating system on a slightly different embodiment of the donut system. It is intended that any of the embodiments shown can be mechanically the same or slightly different and can accommodate either gas fired or electric heating systems.

One significant aspect and feature of the present invention is a gas fired cooking tube.

Another significant aspect and feature of the present invention is a detachable firing module.

A further significant aspect and feature of the gas-fired system of the present invention is a power inverter for operation at a remote site where AC power is not available and, particularly, a power inverter which has 110/120 or 220/240 volt AC output.

Still another significant aspect and feature of the present invention is a battery powered gas fired donut system through the use of a power inverter.

An additional significant aspect and feature of the present invention is the use of interlocks to prevent inadvertent flame propagation.

A still further significant aspect and feature of the present invention is the use of an electric heater to heat the cooking fluid.

A still further significant aspect and feature of the present invention is the interchangeability between gas fired and electric cooking fluid heating systems.

Having thus described one embodiment of the present invention, it is the principal object hereof to provide a gas fired/electrically heated donut cooking system.

Another object of the present invention is a gas fired donut cooking system which can be operated by a battery and a power inverter.

Another object of the present invention is a safe donut cooking system including interlocks for appropriate gas ignition.

A still further object of the present invention is the use of an electric heater to heat the cooking fluid.

A still further object of the present invention is to provide interchangeability between gas fired and electric cooking fluid heating systems.

Other objects of the present invention include a safety proven design that operates with standard propane tanks. The donut system includes many fail-safe devices to prevent misuse. All gas components are A.G.A. listed. All electrical enclosures are UL approved. The donut system operates with quick hookup. Simply fill the machine with oil, attach quick-disconnect gas line to heating module, plug in the power cord for motors into a specially-designed inverter, which is powered by a 12 volt battery and one is in business; or simply connect the required power to the all electric system. The donut system has a variable speed. Solid state speed control varies output from a tantalizing 1 donut per minute up to full speed. One can pace output to sales demand, and always get action attraction. The donut system is easy to clean with only eight basic components. Chains, sprockets, and conveyor flights have been eliminated. It is a breeze to clean.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the Figures thereof and wherein:

FIG. 1 illustrates a side view of a gas fired donut cooking system;

FIG. 2 illustrates a top view of the gas fired donut cooking system;

FIG. 3 illustrates a top view of the gas fired donut cooking system with various members removed;

FIG. 4 illustrates a cross-sectional view along line 4—4 of FIG. 3;

FIG. 5 illustrates a perspective view of the rear side of the enclosure, fry tank and firing module;

FIG. 6 illustrates the mating surfaces of the firing module and the enclosure;

FIG. 9 is an exploded side elevational view of an electric heated alternate embodiment of the donut system;

FIG. 10 represents a top view of the electric heated alternate embodiment;

FIG. 11 is a perspective view of a donut batter dispensing system for use with the donut system of the invention; and FIGS. 12 and 13 represent a fry tank and heating control head which make up a gas-to-electric conversion kit.

DESCRIPTION OF THE PREFERRED EMBODIMENTS

Figure 7:
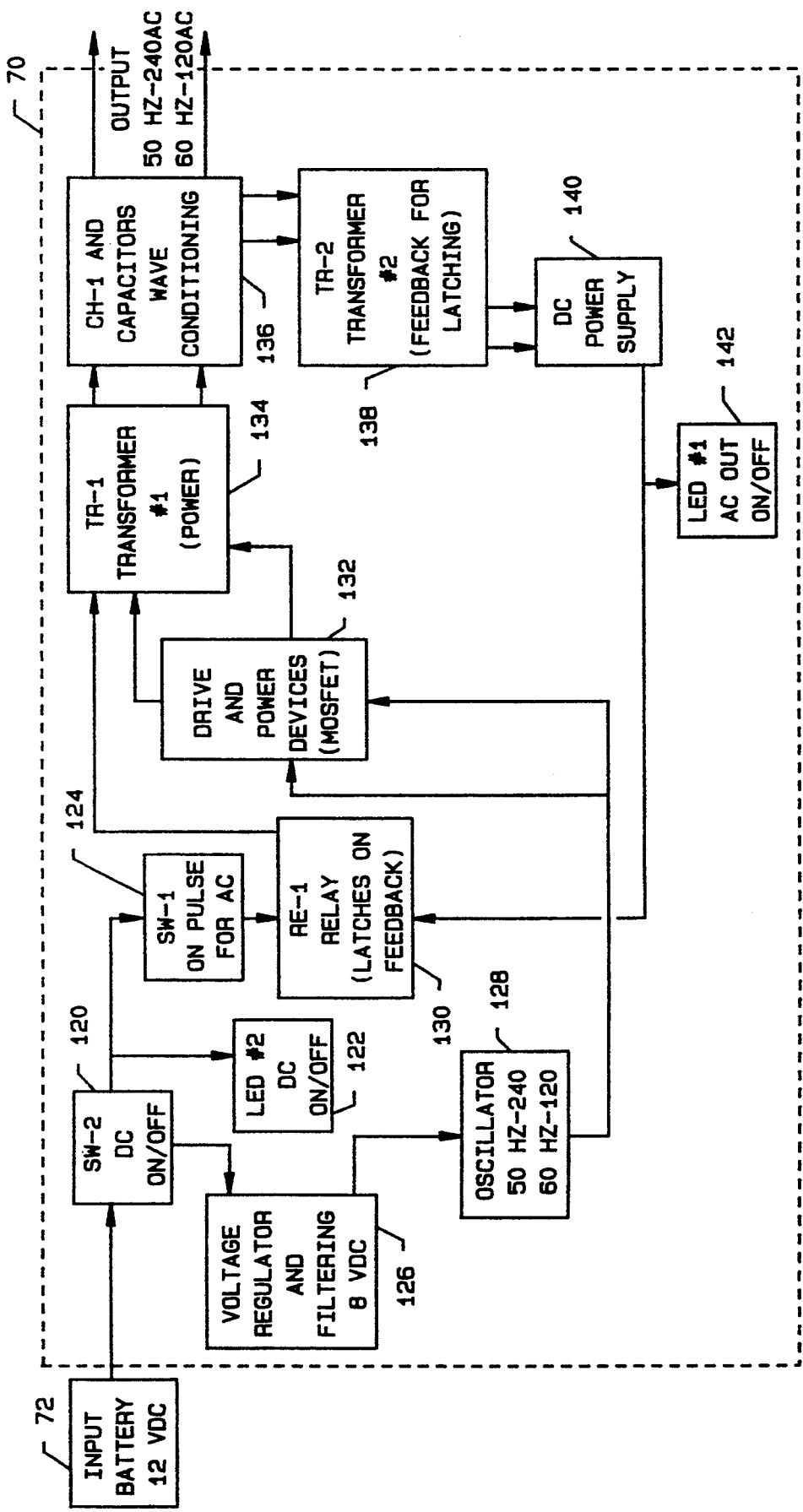
FIG. 7 illustrates a block diagram of the inverter.

FIG. 1 illustrates a side view of a gas fired donut cooking system 10 including an essentially rectangular shaped enclosure 12 having a front side 14, a back side 16, a left end 18, a right end 20, a top side 22, as illustrated in FIG. 2, a bottom 23, and a rectangular top lipped opening 24. A rectangular fry tank 26 with an open top opening 28 aligns in and is accommodated by the top lipped opening 24 of the enclosure 12. A handled tray 30 aligns in and is accommodated by the opening 28 of the fry tank 26. Donut flippers 32 and 34 align across the handled tray 30 and are actuated by a variable speed servo motor assembly 36 as also illustrated in FIG. 2. Donut flipper 32 serves to overturn donuts in the handled tray 30, and donut flipper 34 ejects the donuts from the handled tray 30. A paddle wheel 38 aligns in the handled tray 30 to draw hot cooking liquid from the fry tank 26 and propel it along the handled tray 30 when the donuts are systematically cooked. A paddle wheel drive assembly 39 mounts on the handled tray 30 and drives the paddle wheel 38. A variable output hopper 40 dispenses donut batter into the hot cooking liquid in the handled tray 30. The variable output hopper 40 is suspended from a bracket 42 which rotatingly engages about a support post 44. A hopper drive motor assembly 46 also mounts on the bracket 42 to assist in dispensation of donut batter from the variable output hopper 40. The bracket 42 with the attached variable output hopper 40 and hopper drive motor 46 pivot about the support post 44 so that the variable output hopper 40 can be positioned over the handled tray 30 for dispensation of donut batter therein. In the alternative, the variable output hopper 40 may be positioned in some position other than over the handled tray 30.

A gas fired tube 50 aligns in the fry tank 26 for heating of the cooking liquid. A firing module 52 rotatingly aligns and secures to the left end 18 of the enclosure 12 as later described in detail. The firing module 52 includes a combustion head 53 and an ignition unit 54 and an ignition transformer 63 in housing 51 as described later in detail. A gas coupling 56 is located at the end of the firing module 52. A louvered casing 57 surrounds the components of the firing module 52. A temperature controller housing 58 secures and mates to the enclosure 26. The temperature controller housing 58 includes a rotary temperature control 59, as well as a high temperature shut down thermostat 67 and connector blocks 60, 61, 62, and 64 for connection of the connector block 62 to the servo motor assembly 36, the connector block 60 to the variable output hopper 46, the connector block 61 to the paddle wheel drive assembly 39, and the connector block 64 to the firing module 52, respectively. An electrical cable 65 connects between the connector block 64 on the temperature controller housing 58 to the firing module 52. Also included is a hopper control switch 66 and paddle wheel drive assembly and servo motor control switch 68. A normally open microswitch 73 is closed to allow power flow when the temperature controller housing 58 is secured and mated to the enclosure 26. Removal of the temperature controller housing 58 allows the microswitch contacts 73 to open and disrupt electrical power flow to the various components so that they will cease to function, as well as disrupting electrical power to the firing module 52. A power inverter system can be used so that a battery 72 can provide electrical power for operation in the field where no 110 volt nor 220 volt alternating current is available. A plurality of feet 74a–74n secure to the enclosure 12.

FIG. 2 illustrates a top view of the gas fired donut cooking system 10 where all numerals correspond to those elements previously described. Illustrated in particular is the handled tray 30 with the donut flippers 32 and 34 and the paddle wheel 38.

FIG. 3 represents an unobstructed top view of the gas fired donut cooking system 10 in which, to better illustrate the gas fired tube 50, the variable output hopper 40, paddle wheel 38, paddle wheel drive assembly 39, hopper drive motor 46, the handled tray 30 and other components have been removed. All other numerals correspond to those elements previously described. As shown in FIG. 3, the gas fired tube 50 is essentially U-shaped and aligns in the fry tank 26. The lipped fry tank 26 includes a left end 76, a right end 78, a front 80, a back 82 and a bottom 83. The inlet end 50a of the gas fired tube 50 secures to the left end 76 of the fry tank 26, and the exhaust end 50b secures to the back 82 of the fry tank 26. The combustion head 53 aligns with a circular hole 86 in the left end 18 of the enclosure 12, and with the inlet end 50a of the gas fired tube 50 to heat the gas fired tube 50 and the cooking oil in the fry tank 26. Exhaust gas exits the gas fired tube exhaust end 50b into the enclosure 12 and out through a plurality of louvers 88a–88n as illustrated in FIGS. 3 and 4. FIG. 4 illustrates a cross-sectional view along line 4—4 of FIG. 3 where all numerals correspond to those elements previously described. The exhaust gas routing is illustrated by arrowed lines leading from the exhaust end 50b of the gas fired tube into the enclosure 12 and out of the louvers 88a–88n. The firing module 52 is illustrated with its louvered cover removed and includes a transformer 90, a low voltage ignition control module 92, a solenoid control valve 94 and ignition transformer 51 and flame tube mixer 84 secured to a bracket 96. A gas coupling 56 provides gas to the flame tube mixer 84.

An interlock system is included to prevent flame propagation when the firing module 52 is disconnected from the enclosure 12. A push rod 95 aligns with a normally open microswitch 97 in the firing module 52. When the firing module 52 is aligned against the end 18 of the enclosure 12, the push rod 95 is activated by the left end 18 against the normally open microswitch 97 to allow electrical flow to the ignition control module 92, the solenoid control valve 94, and other associated components. Removal of the firing module 52 opens the microswitch to deactivate the gas firing module 52.

FIG. 5 illustrates a perspective view of the rear side of the enclosure 12, the fry tank 26 and firing module 52 where all numerals correspond to those elements previously described. Illustrated in particular are the exhaust louvers 88a–88n on the back panel 16 of the enclosure 12. A bracket 98 secures to one corner of the enclosure 12. The bracket 98 swingingly supports and accommodates the support post 44 of the hopper drive motor 46 and variable output hopper 40 illustrated in FIG. 1.

FIG. 6 illustrates the mating of the firing module 52 to the enclosure 12, thereby causing alignment of the combustion head 53 of the firing module 52 with the inlet end 50a of the gas fired tube 50 of the enclosure 12. All other numerals correspond to those elements previously described. The left end 18 of the enclosure 12 includes bullet-shaped connectors 100 and 102 for extending outwardly from the left end 18. The bullet-shaped connectors 100 and 102 have a T-shaped profile for engagement with slotted holes 106 and 104 located on the end 108 of the louvered casing 57 of the firing module 52. Engagement of the firing module 52 to the enclosure 12 is accomplished by alignment of the larger diameter portion of the slotted holes 104 and 106 of the firing module 52 with each of the corresponding bullet-shaped connectors 102 and 100, and then rotating the firing unit 52 so that the narrow regions 104a and 106a of slotted holes 104 and 106 are engaged by the bullet-shaped connectors 102 and 100, respectively. During this engagement procedure, the combustion head 53, which is also aligned with a hole 110 in end 108, is aligned with the inlet end 50a of the gas fired tube 50 in the enclosure 12. Arrows 112 and 114 indicate the mating of the firing module 52 and the enclosure 12.

Figure 8:
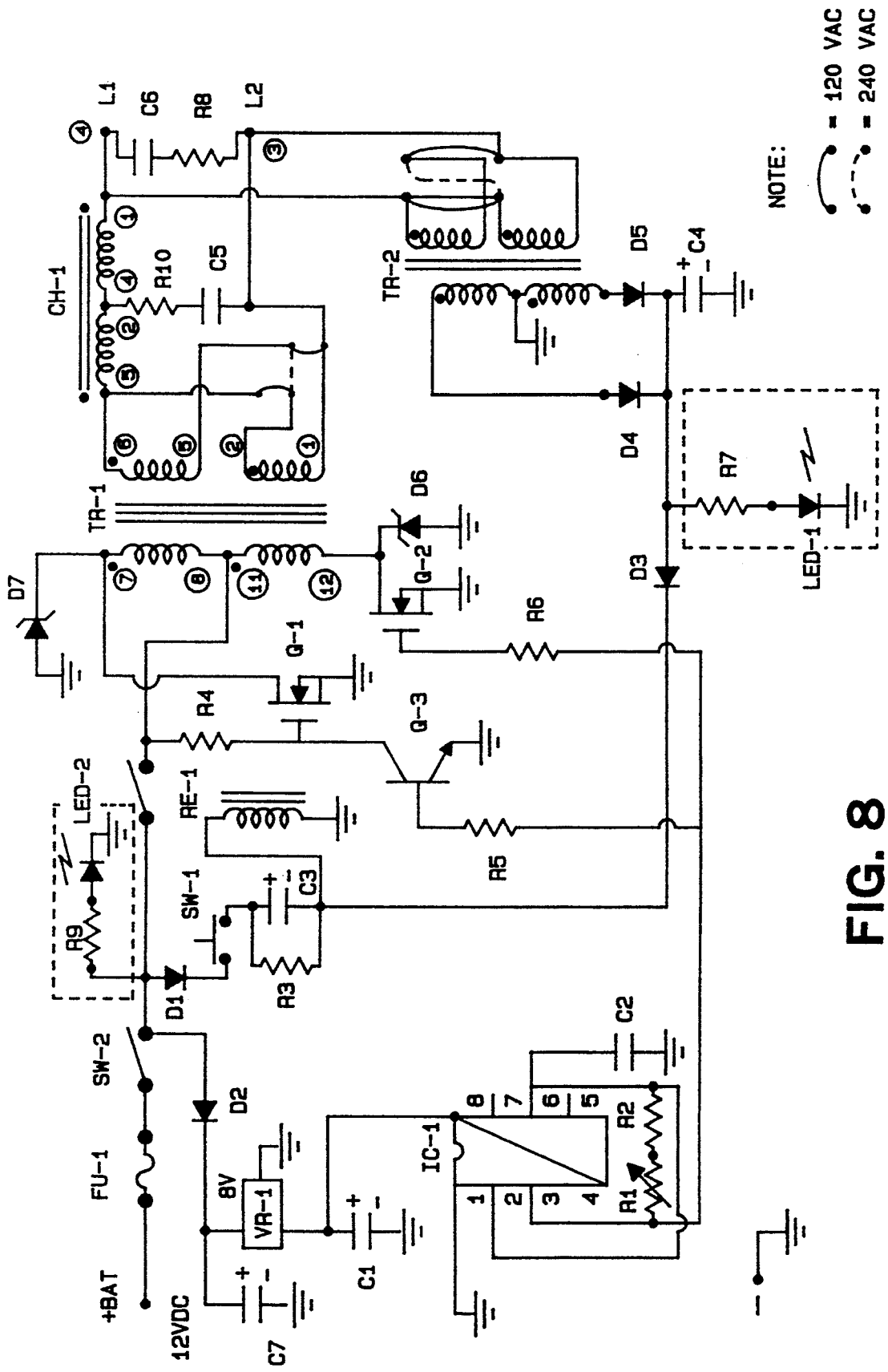
FIG. 8 illustrates a schematic diagram of the inverter.

FIG. 7 illustrates a block diagram of the power inverter 70 where all numerals correspond to those elements previously described. The power inverter 70 is used in conjunction with an external storage battery 72 such as illustrated in FIG. 1. The gas fired donut cooking system 10 is configured to operate from 110 volt AC or 240 volt AC. The power inverter 70 changes 12 volts direct current from the battery 72 to either 120 volt AC or 240 volt AC depending upon which is used in the particular country or location of usage. Jumper wires are positioned internally to supply the correct output voltage as illustrated in FIG. 8. Included is a DC switch 120, an LED 122, an AC switch 124, a voltage regulator 126 with filter, an oscillator 128, a relay 130, a driver 132, a power transformer 136, a wave conditioner 136 including a choke, a feedback transformer 138, a DC power supply 140 and another LED 142.

FIG. 8 illustrates a schematic diagram of the power inverter 70 where all numerals correspond to those elements previously described.

A very accurate type of frequency is in order for the gear motors to turn at a given rate. A timing IC is used to create the pulse rate which has a fifty-fifty balance. One reason is that the transformers tend to saturate if the timing is too long on one side over the other side. The IC is a CMOS based 7555 and has a higher impedance, which operates at a faster switching speed, and feeds back on itself to get the timing. Pin 3 feeds back through the resistor to the capacitor combination that goes into the timing pin, which is pin 6. Pin 1 is to ground, pin 2 is a triggering the initiating signal, pin 3 is the output, pin 4 is reset which normally in this case connects to the plus line to insure no reset takes place, pin 5 is open. Pin 6 is the timing pin, pin 7 is the discharge for the capacitor, but is not used in this configuration, pin 8 is your plus power coming in. This provides balanced timing, which means that at 60 cycles you've got 50% of the time on the plus side and 50% of the time on the ground plane.

With this combination, there is the drive for the transformer $Q_1$ and $Q_2$ are FET type power transistors and are on each side of the primary transformer. Essentially, $Q_1$ and $Q_2$ take the battery signal that comes into the center tab and pull it to ground. There is one of the two that are on at a time. The output of the $Q_3$, provides means to invert input to $Q_1$ ensuring only $Q_1$ or $Q_2$ is on at a given time.

Because the FETs have a very high impedance front end, the FETs can be fed directly with a relatively low level signal and carry quite a bit of power. This particular type literally has built in it a zener type of diode that doesn't show on the print, and has been supplemented with D6 and D7, transient zener.

If there is an imbalance due to any condition at all, one side tends to go into saturation carrying a relatively heavy current and when it does it develops a fairly high transient voltage upon turn-off. That is what both the transistors and transient zeners absorb.

There is a "T" filter arrangement with the inductor. The two windings are separate in an inductor that becomes then like a self-exciter transformer. Notice by the dots on the inductor that one is feeding into the dot side on one end and one is feeding out to the dot side on the other end.

The inductor bends the wave on the front end so that it becomes something like a sine wave. The inductor retards the current flow when TR-1 is switching causing C5 to suddenly flow through the TR-1 secondary winding. It also acts as a transformer to supply a voltage to L1 to offset the sudden voltage drop of C5 and it causes an overshoot voltage that gives the characteristics of a sine wave.

One feature of the circuit is the filtering with the CH1 and the C5. A resistor in series with C5 reduces its discharge rate.

On the outside of L1 to L2, L1 being the hot side and L2 being essentially common is the C6-R8 snubber. What this does is to add to the slow down of both the drop and the rise of the signal. The signal overshoots much like one would get in a sine wave if you're comparing it to average level and then it breaks back and is somewhat squarish at the end but it is drooping off, so it's a skewed sine wave. The reason is two-fold for this application. One, if there is too high of a rise rate, which one would have with a square wave output, one might overdrive the electronics. This would cause the electronic controls to become almost transparent because the changed rate of voltage would be so fast that one would internally force trigger of the controls. The second is that with the gear motors, the hysteresis of the motor gives torque action and if one has a square wave, the applied signal has a large amount of harmonics in it which tends to overheat the laminations of the gear motors. This filter arrangement reduces the harmonics.

The TR2 down below feed back to the RE1 relay. The purpose of that is that at the end of the cycle during discharge of the battery if it gets just too low, one wants the current to drop out. The feedback holds the relay in until the voltage is down below a predetermined level, probably in about the 10 to 11 volt level. Also, the unit will turn on if the AC circuit is short circuited.

VR1 is a voltage regulator to insure that the oscillation rate is constant over variable heat conditions, voltage conditions, etc.

The transformer T1 is made with two separate coils or bobbins that can be driven either way. It is a conventional dropping transformer, but because its field coupling is the same being driven up or down, it can be used as an inverter transformer.

In accordance with one important aspect of the invention, the cooking liquid may also be heated by other means including an electric heating system. The electric heating system may be designed to be interchangeable with the gas heating system on the same or a similar embodiment or may be used in the design of an all-electric embodiment of the donut system of the invention. The interchange can be accomplished without mechanically changing the other aspects of the machine and may readily be accomplished by removal and replacement of the existing heating system. The use of a particular heating system might depend on the availability and cost of electric power compared with gas or on other local rules and regulations, as the case may be.

The illustration of the parts with respect to the remainder of the electric-heated embodiment aside from the heating system itself may be identical, or may be different from, those associated with the gas-fired system; and so different reference numerals have been included. The electric heated embodiment is shown in FIGS. 9–11 and a fry pan and heating control head for a conversion kit are shown in FIGS. 12 and 13. These will next be described.

FIG. 9 depicts a side, elevational view of the electrically fired or heated embodiment of the donut system. The main vessel includes a generally hollow rectangular-shaped enclosure in the form of a tank chassis 210 supported on adjustable legs 212 and which may be situated or carried on a concrete surface or floor 214. The rectangular tank chassis further includes front and back sides 216 and 218 (FIG. 10) and right and left sides 220 and 222, respectively. The tank chassis, as in other embodiments, further has a rectangular top opening that receives and carries a nested similarly shaped internal vessel or fry tank 224 having a top opening 226 provided with a peripheral lip or flanged rim at 228 designed to support the fry tank 224 in relation to the tank chassis 210. A post support bracket 230 with socket 232 supports a post 234 associated with the donut batter dispensing system and is also carried by the tank chassis.

Automatic handling tray 236 aligns in and is accommodated by the top opening 226 of the fry tank 224. A donut flipper including flipper escapement or guide 238 with flipper basket 240 and an ejector system including guide 242 and ejector basket 244 are aligned across the automatic tray seen in FIG. 10. A variable speed servo motor 246 is mounted on the tank chassis, with associated speed control 248 and output crank 250, operates on eccentric 251 (FIG. 9), which, in turn, is connected to and operates tray linkage 253. In this manner, the tray linkage actuates the flipper basket which flips or turns the donuts during the cooking cycle and also operates the ejector basket to eject fully cooked donuts from the automatic tray 236. The automatic handling tray may also be provided with a polytetrafluoroethylene (PTFE) drop plate 247 and stainless steel drop plate 249.

The fry tank 224 and the automatic tray 236, when operated, contain an amount of heated liquid cooking fluid, normally cooking oil. A paddle wheel 252 operated by a drive system including motor 254, connecting driveshaft 256 and gear 258 continually circulates hot cooking fluid from the fry tank 224 along the length of tray 236. A cover 260 prevents spattering of the cooking liquid and a liquid filter system including a filter basket 262 and filter element or screen 264 continually filter the circulating liquid to remove debris.

The batter processing system includes a variable output hopper 270 with outlet hopper bowl 271. The system is conceived to drop formed donut batter into the heated cooking liquid from above and so the system is suspended from a bracket or gusset 272 which is rotatably or pivotably mounted on the support post 234. The bracket 272 also carries a hopper drive motor assembly including drive motor 274 with rotary control switch 276. The motor drive is further provided with and connected to a size control wheel 278 with thumb knob 280 which is spring-loaded at 282 to retain an adjusted position. Eccentric 284 and connecting rod 286 connect the hopper drive motor assembly to a plunger assembly located in the hopper 270 which reciprocally operates a piston member 288 relative to a cutter die 290 to produce donut shapes or any desired shape from the batter in accordance with the shape of the cutter die 290. The plunger system further includes a plunger rod 292 fastened as by a set screw 294 to plunger bushing 296 which attaches the plunger rod to the connecting rod 286. Plunger spiders 298 and bivalve disk 300 with bushing 302 complete the plunger assembly.

The hopper vessel 270 is carried by a plurality of fixed arms as at 304 integral with the mounting bracket which are adapted to engage and retain the rim 306 of the hopper vessel. Power is supplied to the drive motor 274 via connector 308.

An electric heating system or heating control head module 310 including a main electric immersion heating element 312 is provided for use with the fry tank 224 adapted to be positioned in the fry tank to heat the cooking liquid. The control head further includes an electric control module, to which the heating element is connected and which includes a rotary heat control dial 314 which may control a rheostat or other power or voltage modulating device. ON/OFF switch 316 controls power to the hopper drive motor from the main heating control head module. ON-OFF switch 318 controls power to the drive motors 254 and 246 from the main heating control head module. A high limit safety shut-off switch is provided which shuts off the heater when necessary to prevent overheating of the cooking liquid. A mounting flange matching the safety fuse or other electrical overload disconnect device (not shown) is located in fuse holder 322.

As shown in FIGS. 12 and 13, the only additional components required to convert a gas fired system back to an all electric arrangement are the heating control head module 310 and the fry tank. These can be supplied in the form of retrofit kits in both 110/120 volt AC and 220/240 volt AC or other convenient voltage and power ratings. The electric fired system is typically 2,300 watts or greater in heat input which is equivalent to the 8,500 gross BTU or greater gas fired input.

In accordance with one aspect of the invention, then, the heating of the cooking liquid may be accomplished based on either a gas-fired or an electric-heated system without mechanically changing the rest of the system. Of course, the availability of adequate electric power with respect to the heating of the cooking liquid also eliminates the need for the battery and inverter system utilized to operate the remaining alternating current devices although a battery recharging system could also be provided using the available power. Thus, the servo motor 246, paddle wheel operating motor 254 and hopper drive motor 274 can be direct AC powered in a well-known manner from the electric module heating control head 310.

MODE OF OPERATION

FIG. 1 best illustrates the mode of operation of the gas fired donut cooking system 10. Cooking liquid contained in the fry tank 26 is heated by the gas fired tube 50. The firing module 52 aligns with and introduces a flame into the inlet end 50a of the gas fired tube 50 to heat the cooking liquid. The flame in the firing module 52 is controlled by the temperature control 59 and associated components, which can be powered either by 110 or 240 volt AC directly from a wall socket or may be powered by the battery 72 and power inverter 70 when operated in a remote location where normal alternating current is not available. The variable output hopper 40 dispenses donut dough into the hot cooking liquid which flows through the handled tray 30. The paddle wheel drive assembly 39 drives the paddle wheel 38 to cause the hot cooking oil to flow from the lower regions of the fry tank 26 and across the handled tray 30. Donut flippers 32 and 34 provide for overturning donuts and ejecting them from the gas fired donut cooking system 10.

An "In Shot" type heating method, that is, the gas jet is injected into a U-shaped stainless steel tube which is immersed in the oil and hermetically welded within and to the fry tank. A cooking temperature (375° F. or 190° C.) is reached in less than 30 minutes. The "in shot" system is more safe and efficient than open flame burners, which radiate heat rather than "injecting" heat. The heating module attaches to the end of the "in shot" tube and has a net output of 8,500 BTU or more. This module includes an automatic igniter which shuts the system down if ignition does not occur within 6 seconds. Should oil temperature exceed 425° F. (268° C.) or should the temperature controller head be removed, the unit automatically shuts down. One 20 lb. (9 Kg) tank of propane will power the machine for 40 hours. The machine normally includes a factory pre-set nonadjustable regulator and a quick-disconnect hose (tank not included). The power inverter module is powered by a 12 volt battery and has an output of either 110 V/120 V, 60 Hz or 220 V/240 V, 50 Hz, which powers the control motors. A 100 ampere/hour battery will last about 8–9 hours before recharging.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

I claim:

1. A cooking fluid production frying apparatus configured to be compatible with either electric or gas-fired energy input systems, the apparatus further being configured to readily exchange electric and gas heating systems comprising:
    (a) a chassis means carrying a readily detachable and exchangeable fry tank means, said fry tank means designed to accommodate an amount of cooking fluid circulatable therein;
    (b) a heating means mounted in said fry tank means, said fry tank means being fabricated to combine with a particular heating means, said heating means being selected from the group consisting of gas-fired immersion tubes and electric immersion heaters;
    (c) dough dispensing means coupled to said chassis means for dispensing batter, such as donut batter, into cooking fluid placed in said fry tank;
    (d) temperature control means associated with the heating means for controlling the temperature in the cooking fluid; and
    (e) wherein said fry tank means in combination with said heating means are adapted to be exchanged as a fabricated combination to convert the production frying apparatus optionally between a gas-fired and electric-heated system.

2. The apparatus of claim 1 wherein the conversion from gas-fired to electric-heated requires only the removal and reattachment of the desired fry tank and integral heating means.

* * * * *